US009272567B2

(12) United States Patent
Polk et al.

(10) Patent No.: US 9,272,567 B2
(45) Date of Patent: Mar. 1, 2016

(54) METHOD AND APPARATUS FOR TRANSFERRING IMAGES ONTO A CURVED SURFACE

(75) Inventors: Michael Lane Polk, Mint Hill, NC (US); Gregory Lee Franklin, Indian Trail, NC (US); Armand Wayne DeSollar, Simpsonville, SC (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 1040 days.

(21) Appl. No.: 13/330,599

(22) Filed: Dec. 19, 2011

(65) Prior Publication Data
US 2013/0153129 A1 Jun. 20, 2013

(51) Int. Cl.
*B65C 3/14* (2006.01)
*B44C 1/17* (2006.01)
*B65C 9/36* (2006.01)
*B65C 3/00* (2006.01)
*B29C 65/00* (2006.01)
*B65C 9/46* (2006.01)
*B65C 9/02* (2006.01)
*B65C 9/42* (2006.01)
*B65C 9/08* (2006.01)
*B29C 65/18* (2006.01)

(52) U.S. Cl.
CPC ............... *B44C 1/17* (2013.01); *B29C 66/8167* (2013.01); *B65C 3/14* (2013.01); *B65C 9/36* (2013.01); *B29C 65/18* (2013.01); *B29C 66/80* (2013.01); *B65C 9/02* (2013.01); *B65C 9/08* (2013.01); *B65C 9/42* (2013.01); *Y10T 156/1033* (2015.01)

(58) Field of Classification Search
CPC ...... B44C 1/17; Y10T 156/1033; B65C 3/14; B65C 9/02; B65C 9/36; B65C 9/08; B65C 9/42; B29C 65/18; B29C 66/80; B29C 66/8167; B29C 66/83413; B29C 66/83513
See application file for complete search history.

(56) References Cited

U.S. PATENT DOCUMENTS

| | | | | |
|---|---|---|---|---|
| 3,899,913 A | * | 8/1975 | Schlosser et al. | ............... 72/383 |
| 4,658,721 A | | 4/1987 | Mathis | |
| 4,694,633 A | * | 9/1987 | Fujio et al. | ........................ 53/49 |
| 4,874,454 A | | 10/1989 | Talalay et al. | |
| 4,943,684 A | * | 7/1990 | Kramer | ........................ 428/34.4 |
| 4,989,508 A | | 2/1991 | King | |
| 5,019,193 A | | 5/1991 | Aramini | |
| 5,170,704 A | | 12/1992 | Warren et al. | |
| 5,244,529 A | | 9/1993 | Siegel | |
| 5,318,942 A | | 6/1994 | Laudy | |
| 5,395,478 A | | 3/1995 | Sattler et al. | |
| 5,584,961 A | * | 12/1996 | Ellsworth et al. | ............. 156/481 |

(Continued)

*Primary Examiner* — Sonya Mazumdar
(74) *Attorney, Agent, or Firm* — Blakely, Sokoloff, Taylor & Zafman LLP

(57) ABSTRACT

The application of image transfer paper and a wrap to a curved surface of a container is described. A device for affixing the image transfer paper and wrap includes a base, a support member to support the container, and two wrap applicator arms coupled to the base in a pivoting manner. The support member includes a shoulder and, when the container is placed upon the support member, an edge of the container around an opening of the container rests upon the shoulder and a perimeter of the shoulder extends beyond a perimeter of the edge of the container. The shoulder receives the image transfer paper and aligns the image transfer paper with the edge of the container. Each wrap applicator arm is configured to receive a respective end of the wrap. Rotating the wrap applicator arms about the support member stretches the wrap around the container and image transfer paper.

18 Claims, 12 Drawing Sheets

(56) References Cited

U.S. PATENT DOCUMENTS

| | | |
|---|---|---|
| 5,711,837 A | 1/1998 | Kantrowitz |
| 5,755,921 A | 5/1998 | Christensen |
| 5,802,969 A | 9/1998 | Wess et al. |
| 5,876,547 A | 3/1999 | Kiesow et al. |
| 5,944,931 A | 8/1999 | Cranford |
| 5,997,678 A | 12/1999 | Wess et al. |
| 7,398,811 B1 * | 7/2008 | Duncan et al. ................ 156/392 |
| 7,708,042 B2 * | 5/2010 | McCarthy et al. ............ 156/481 |
| 2006/0283555 A1 | 12/2006 | Green |
| 2010/0015368 A1 | 1/2010 | Wang et al. |

* cited by examiner

METHOD AND APPARATUS FOR TRANSFERRING IMAGES ONTO A CURVED SURFACE

FIELD

Embodiments of the present invention relate generally to the field of image transfer. In particular, embodiments of the present invention relate to affixing a compression sleeve and transfer paper to a curved surface of a container to facilitate the sublimation transfer of an image to the container.

BACKGROUND

Sublimation image transfer is often used to decorate containers, such as coffee mugs. The process of transferring an image using sublimation includes printing a design on a sheet of image transfer paper using sublimation ink, attaching the transfer paper to a container, and applying pressure and high temperature to cause the sublimation ink to transfer from the transfer paper to the container.

A current process of attaching the transfer paper includes manually attaching the transfer paper to the container. The operator manually positions the transfer paper and applies a piece of tape to hold it in place. With the transfer paper in place, the operator affixes a compression device to the transfer paper and container to apply consistent pressure over the surface of the transfer paper and container. The operator secures the compression device with a clamp, clip, or other type of fastener.

This manual process is slow, requires many operators to generate high yield, and is prone to errors due to misaligned images that occurs during positioning of the image transfer paper or poor image quality due to the way in which the compression sleeve is affixed to the container. Misaligned images can be costly as it results in defective containers. Image alignment is especially crucial when the image transfer process includes leaving a border or other space between the image and an edge of the container (i.e., when it is not a full bleed).

While devices have been designed to assist in the automation of the application of a compression sleeve to a container, these devices lack the means for consistent application, reducing steps in the process and alignment of the transfer paper.

SUMMARY

An apparatus and method for the application of image transfer paper and a wrap to a curved surface of a container are described. In one embodiment, the apparatus for affixing the image transfer paper and wrap includes a base, a support member to support the container, and two wrap applicator arms coupled to the base in a pivoting manner. The support member includes a shoulder and, when the container is placed upon the support member, an edge of the container around an opening of the container is supported by the shoulder and a perimeter of the shoulder extends beyond a perimeter of the edge of the container. The shoulder receives the image transfer paper and aligns the image transfer paper with the edge of the container. Each wrap applicator arm is configured to receive a respective end of the wrap. Rotating the wrap applicator arms about the support member stretches the wrap around the container and image transfer paper.

In one embodiment, the method of affixing an image transfer paper to a curved surface of a container using a device including a base, support member coupled to the base, and two wrap applicator arms coupled to the base in a pivoting manner includes placing the container upon the support member. The method includes the support member to support the container. The support member includes a shoulder and, when the container is placed upon the support member such that an opening in the container receives a portion of the support member that is elevated above the shoulder, an edge of the container around the opening rests upon the shoulder and a perimeter of the shoulder extends beyond a perimeter of the edge container. The method further includes supporting the image transfer paper with the support member such that an edge of the image transfer paper rests upon the shoulder to align the image transfer paper with the edge of the container. The method further includes securing an end of a wrap to each of the wrap applicator arms and rotating the wrap applicator arms about the support member to stretch the wrap around the container and image transfer paper.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

A method and apparatus for transferring images onto a curved surface is described. As used herein, a curved surface refers to both a surface that deviates from a flat or straight plane in a smooth, continuous manner (e.g., the surface of a cylinder, cone, truncated cone, etc.) as well as a surface that deviates from a flat or straight plan in a stepped, continuous manner (e.g., the surface of a regular hexagon or other multi-sided surface) or combination of these two types of surfaces. Exemplary curved surfaces include the exterior of a mug, a vase, a cup, a pencil holder, etc.

Figure 1:
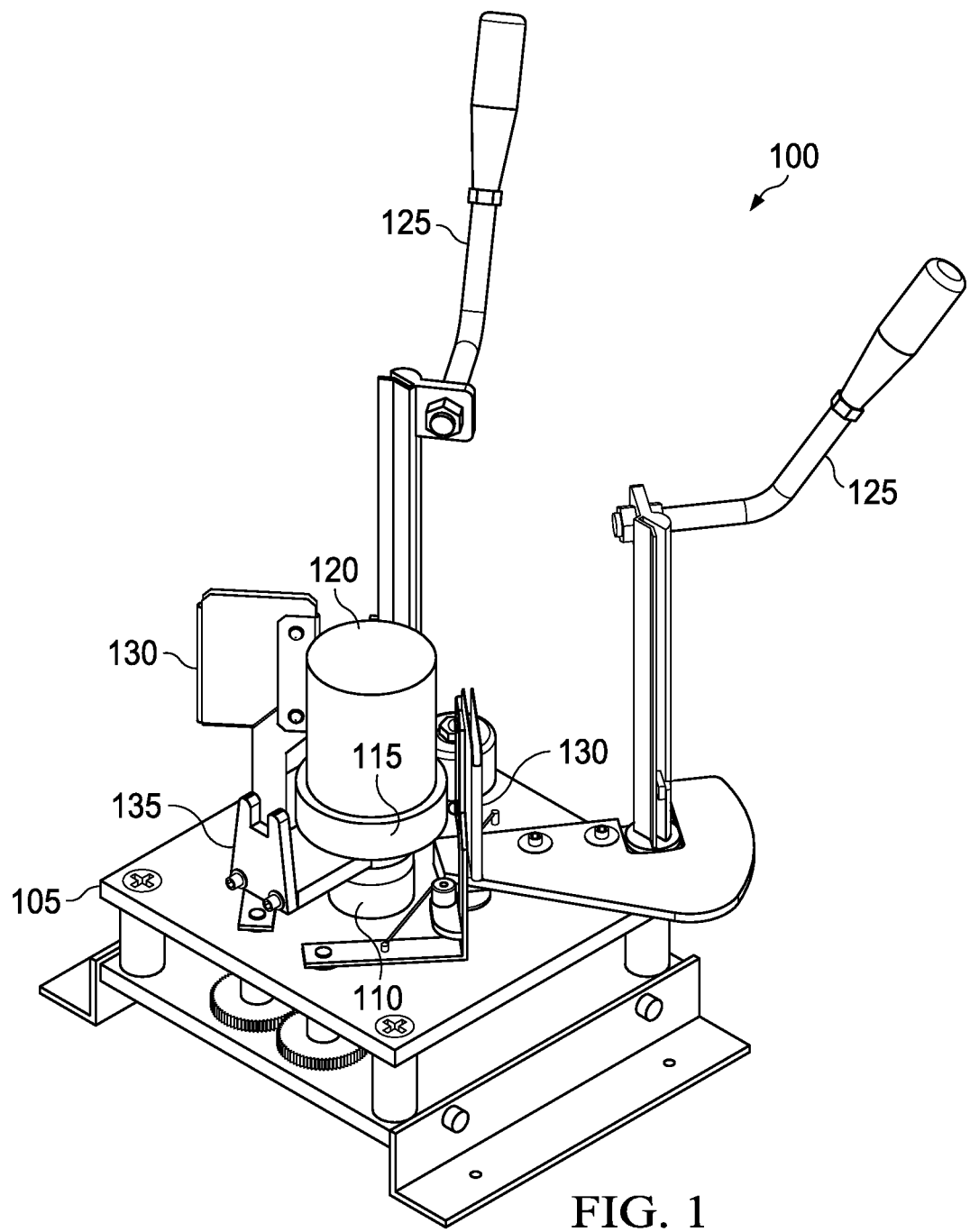
FIG. 1 shows a perspective view of an exemplary embodiment of an apparatus for affixing image transfer paper and a wrap to a curved surface of a container.

FIG. 1 shows a perspective view of an exemplary embodiment of an apparatus 100 for affixing image transfer paper and a wrap to a curved surface of a container. In one embodiment, the apparatus 100 includes a base 105, a support member 110 to support the container, and two wrap applicator arms 125 coupled to the base in a pivoting manner.

The support member 110 includes a top portion 120 that may be inserted within an opening of a container. When the container is placed upon the support member 110, an edge of the container around the opening of the container rests upon the shoulder 115 and a perimeter of the shoulder 115 extends beyond a perimeter of the edge of the container. The shoulder 115 also receives the image transfer paper and aligns the image transfer paper with the edge of the container. This alignment of the image transfer paper enables the image transfer process to leave an aligned border or other space between the image and an edge of the container or otherwise align the final image with the container.

In one embodiment, the apparatus 100 includes two image transfer paper positioning arms 130 coupled to the base in a pivoting manner. Each image transfer paper positioning arm 130 receives a respective end of the image transfer paper to hold the image transfer paper in an aligned position until the wrap is positioned to hold the image transfer paper. Alternatively, the image transfer paper is positioned and held in an aligned position by hand (e.g., in an embodiment without image transfer paper positioning arms 130).

In one embodiment, the apparatus 100 includes a slotted support member 135 to secure a handle of the container when the container is placed upon the support member 110. For example, if the container is a handled mug, the slotted support member 135 secures the handle to minimize rotational movement of the container. In one embodiment, the slotted support member 135 is adjustable to accommodate handles of different widths and/or heights.

Figure 2:
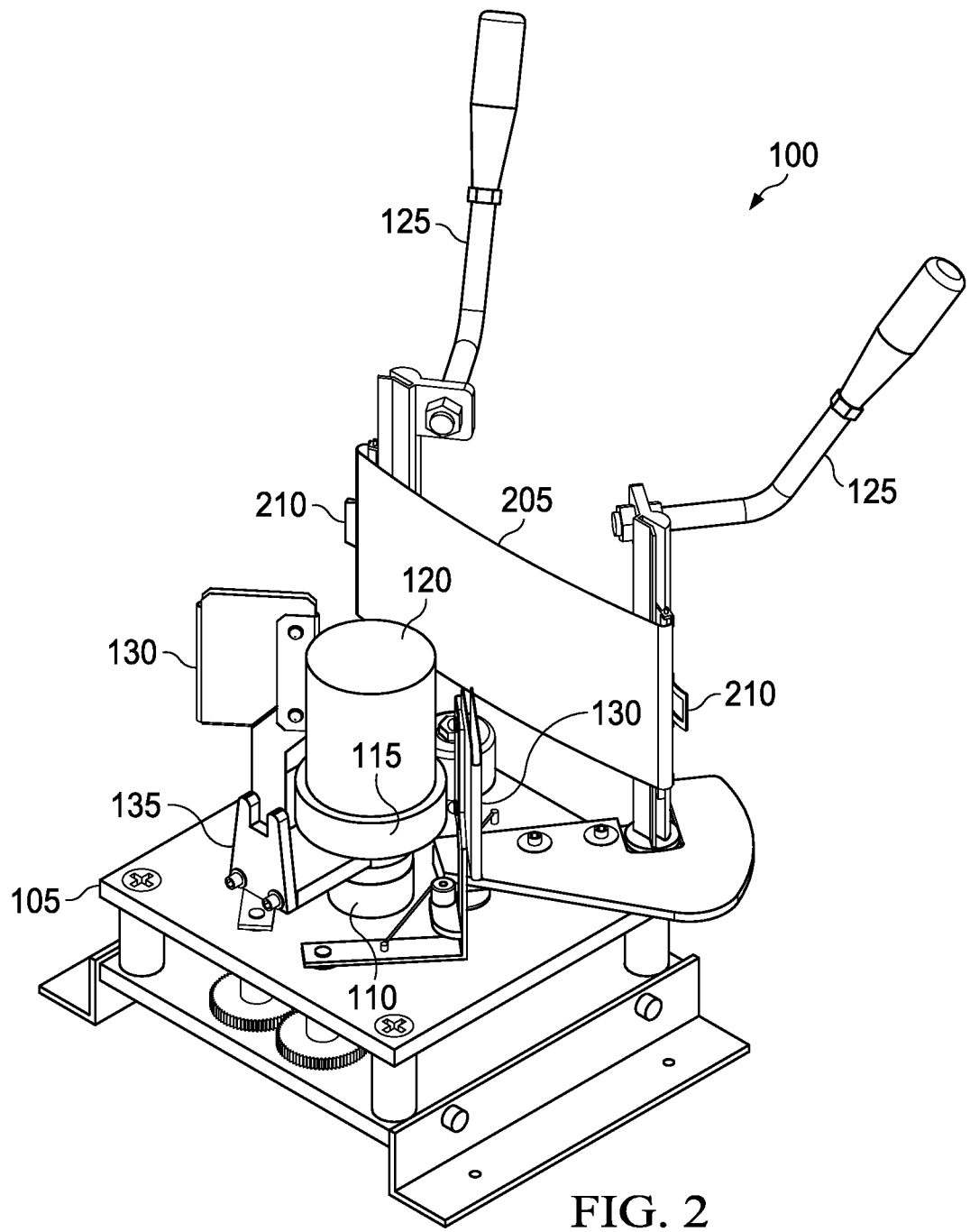
FIG. 2 shows a perspective view of the apparatus illustrated in FIG. 1 with the wrap attached to the wrap applicator arms.

FIG. 2 shows a perspective view of the apparatus 100 illustrated in FIG. 1 with a wrap 205 attached to the wrap applicator arms 125. Each wrap applicator arm 125 is configured to receive a respective end of the wrap 205. In one embodiment, the wrap 205 includes rigid members at either end. Each rigid member is inserted into a recess or slot in a corresponding wrap applicator arm 125. Tension on either end of the wrap, e.g., caused by elasticity of the body of the wrap 205, creates lateral torque on the rigid members. This torque, combined with friction between the rigid member and the wrap applicator arm 125, holds the ends of the wrap 205 within the opening or slots in the wrap applicator arms 125.

In one embodiment, each end of the wrap 205 includes mating fastening components 210. The wrap applicator arm holding slots are arranged (e.g., depth, width, angle, etc.) to maintain tension on the ends of the wrap while the applicator arms 125 are rotated about the support member 110. The rotation of the applicator arms 125 eventually causes the mating fastening components 210 to be coupled together. As will be described below, the wrap applicator arm holding slots are further arranged to release the ends of the wrap 205 when the wrap mating fastening components 210 are coupled together.

Figure 3:
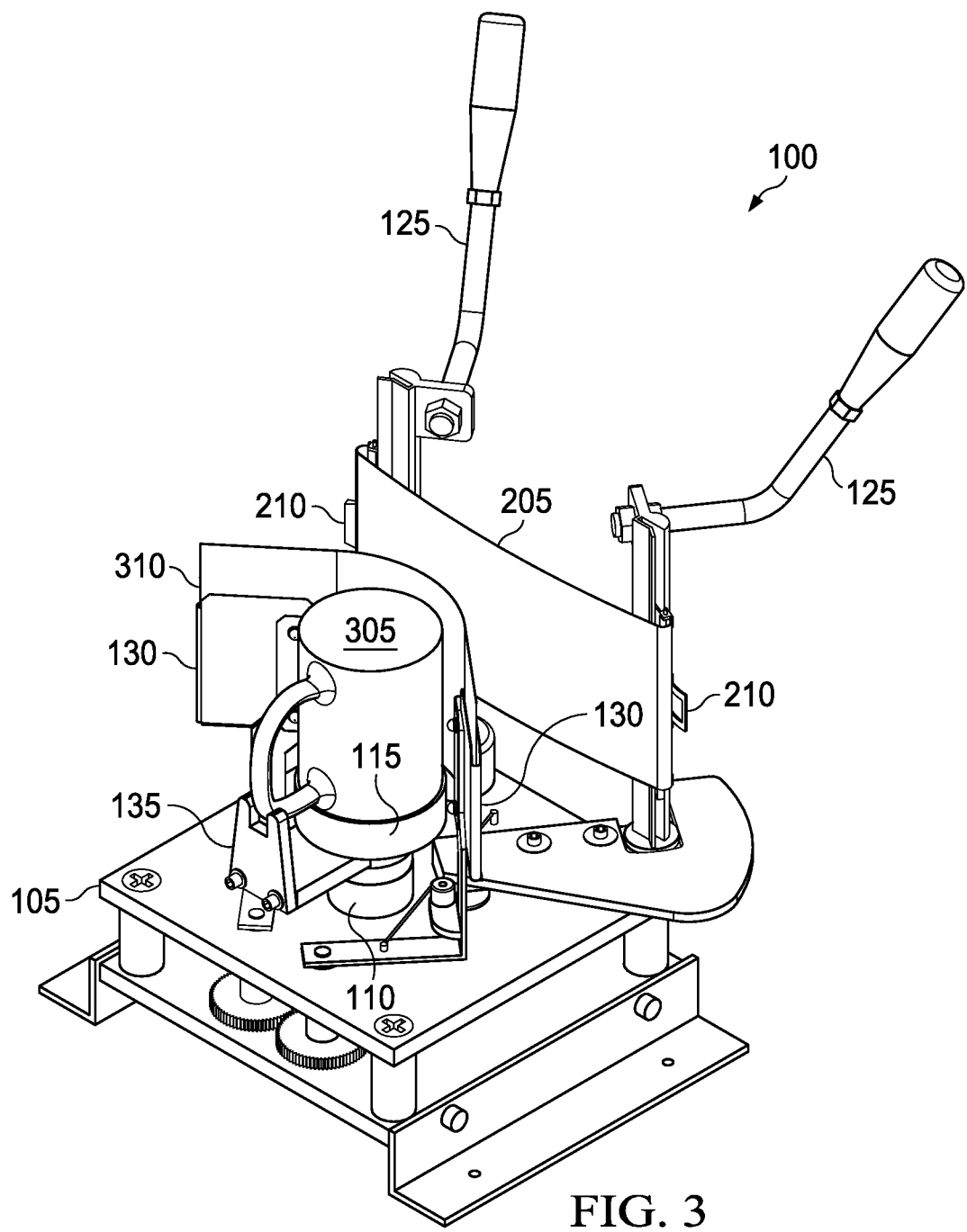
FIG. 3 shows a perspective view of the apparatus illustrated in FIG. 2 with a container placed upon the support member and image transfer paper aligned with an edge of the container.

FIG. 3 shows a perspective view of the apparatus 100 illustrated in FIG. 2 with a container 305 placed upon the support member 110. A piece of image transfer paper 310 is placed between the wrap 205 and the container 305. An edge of the image transfer paper 310 rests upon the shoulder 115. As described above, an end of the container 305 (e.g., the edge around an opening of the container 305) rests upon the shoulder 115. The perimeter of the shoulder 115 extends beyond the perimeter of the edge of the container 305, enabling the shoulder 115 to receive and align the image transfer paper 310 with the edge of the container. As described above, in an embodiment that includes a slotted support member 135, the slotted support member 135 secures a handle of the container 305 to minimize rotational movement of the container.

Figure 4:
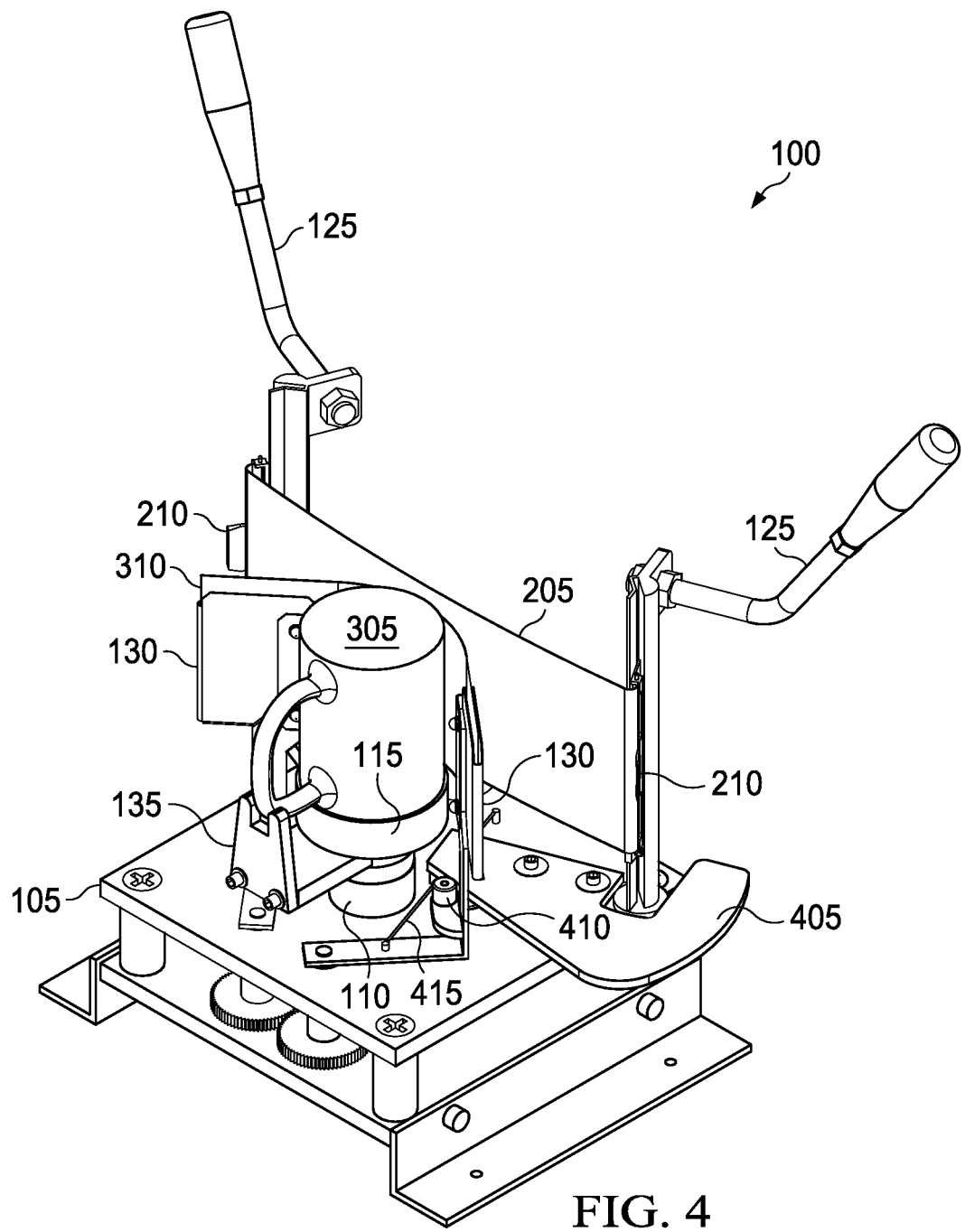
FIG. 4 shows a perspective view of the apparatus illustrated in FIG. 3 with the wrap applicator arms partially rotated about the support member.

FIG. 4 shows a perspective view of the apparatus 100 illustrated in FIG. 3 with the wrap applicator arms 125 partially rotated about the support member 110. As illustrated in FIG. 4, the wrap 205 makes contact with the image transfer paper 310 and container 305 when the wrap applicator arms 125 partially rotated about the support member 110 to particular position. Rotating the wrap applicator arms 125 about the support member 110 stretches the wrap 205 around the container 305 and image transfer paper 310. Stretching the wrap 205 around the container 305 secures the image transfer paper 310 to the exterior surface of the container in manner to apply consistent pressure over the exterior surface of the image transfer paper 310 and container 305.

In one embodiment, the apparatus 100 includes a cam 405 coupled to a wrap applicator arm 125. As illustrated in FIG. 4, rotating the wrap applicator arms 125 brings the cam 405 into contact with an image transfer paper positioning arm 130. Further rotation causes the image transfer paper positioning arms 130 to rotate. In one embodiment, a ball bearing cam follower 410 coupled to an image transfer paper positioning arm 130 aids in maintaining a smooth translation of the rotation of the wrap applicator arms 125 into rotation of the image transfer paper positioning arms 130.

In one embodiment, the apparatus 100 also includes a spring 415 or similar device for keeping tension on the image transfer paper positioning arms 130. This tension keeps an image transfer paper positioning arm 130 in contact with the cam 405 during the rotation of the wrap applicator arms 125. Additionally, when the wrap applicator arms 125 are returned to their starting position illustrated in FIGS. 1-3, the spring 415 causes the image transfer paper positioning arms 130 to their starting position illustrated in FIGS. 1-3.

Figure 5:
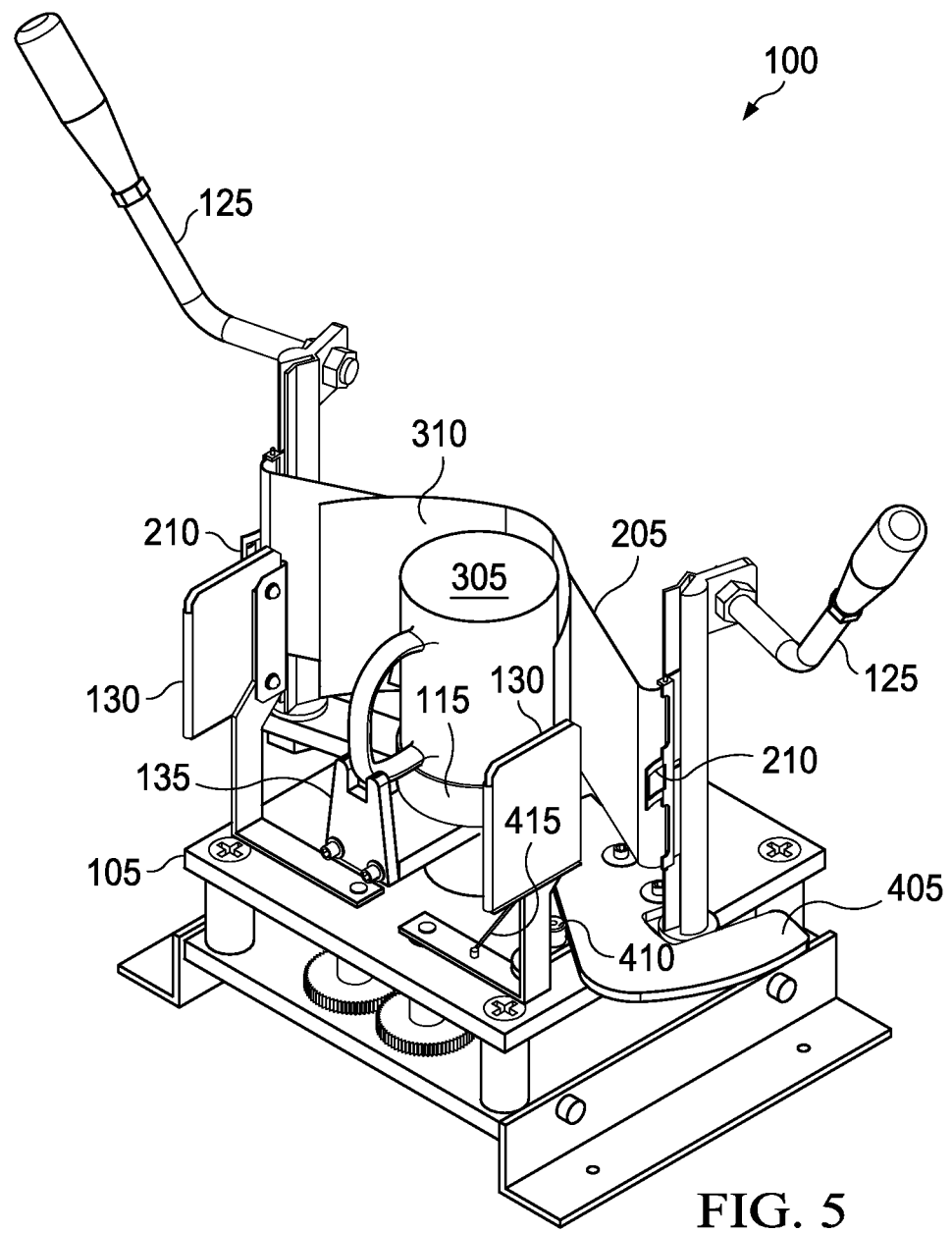
FIG. 5 shows a perspective view of an embodiment of the apparatus illustrated in FIG. 4 in which image transfer paper positioning arms are triggered to rotate in response to the rotation of the wrap applicator arms.

FIG. 5 shows a perspective view of an embodiment of the apparatus 100 illustrated in FIG. 4 in which the image transfer paper positioning arms 130 are triggered to rotate in response to the rotation of the wrap applicator arms 125. For example, each of the wrap applicator arms 125 may be coupled to the image transfer paper positioning arms 130 by the way of gears and/or one or more cams 405 to translate the rotation of the wrap applicator arms 125 into rotation of the image transfer paper positioning arms 130. In one embodiment, the rotation of the image transfer paper positioning arms 130 is not triggered or otherwise initiated until the wrap applicator arms 125 reach a predetermined position in their rotational path—e.g., when the wrap 205 makes contact with the image transfer paper 310 and the container 305. As illustrated in FIG. 5, the rotation of the wrap applicator arms 125 has caused the cam 405 to move the image transfer paper positioning arms 130 from the position illustrated in FIG. 4.

As described above, the image transfer paper positioning arms 130 include holding slots to receive respective ends of the image transfer paper 310. These holding slots release the image transfer paper 310 as the image transfer paper positioning arms 130 rotate about the support member 110.

Figure 6:
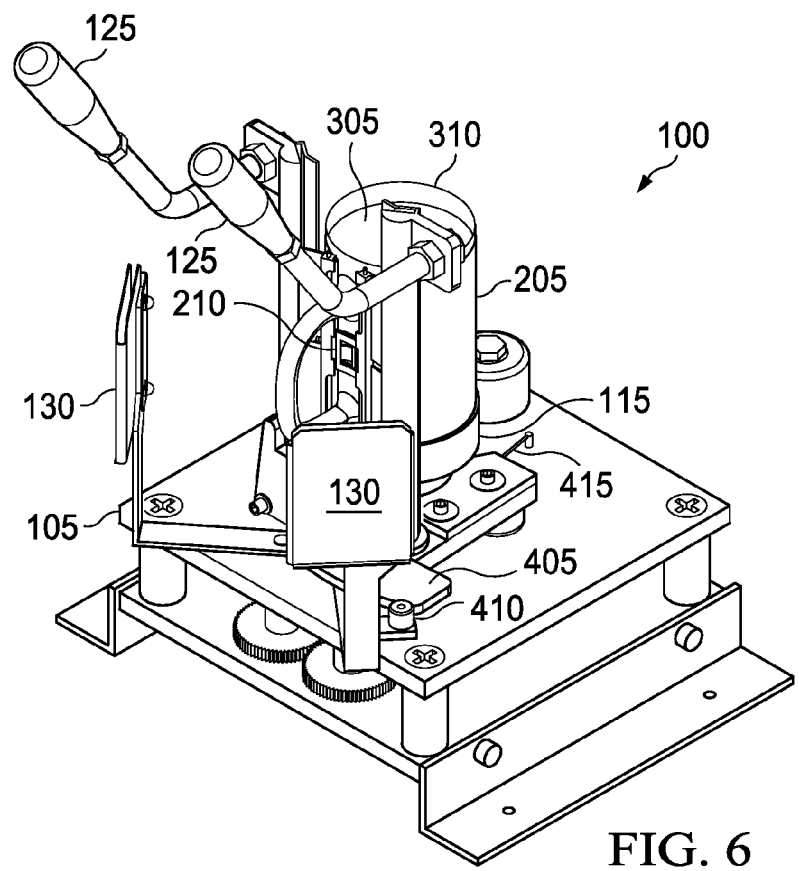
FIG. 6 shows a perspective view of the apparatus illustrated in FIG. 5 in which the wrap applicator arms are rotated to a position in which mating fastening components on either end of the wrap are coupled together.

FIG. 6 shows a perspective view of the apparatus illustrated in FIG. 5 in which the wrap applicator arms 125 are rotated to a position in which mating fastening components 210 on either end of the wrap 205 are coupled together. As the rotation of the wrap applicator arms 125 brings the mating fastening components 210 into proximity with one another, a protection member (described below) limits or prevents contact between the mating fastening components 210 and the container 305.

In one embodiment, the rotation of the wrap applicator arms 125 causes the mating fastening components 210 to automatically couple together. Alternatively, an operator of the device 100 must take further action once the mating fastening components 210 are in proximity with one another to cause them to couple together. In one embodiment the mating fastening components 210 are corresponding portions of a hook and eye closure, buckle, or clasp. Alternatively, the mating fastening components 210 are corresponding portions a snap, nut and bolt, or another fastener capable of securing the wrap 205 around the container 305.

Figure 7:
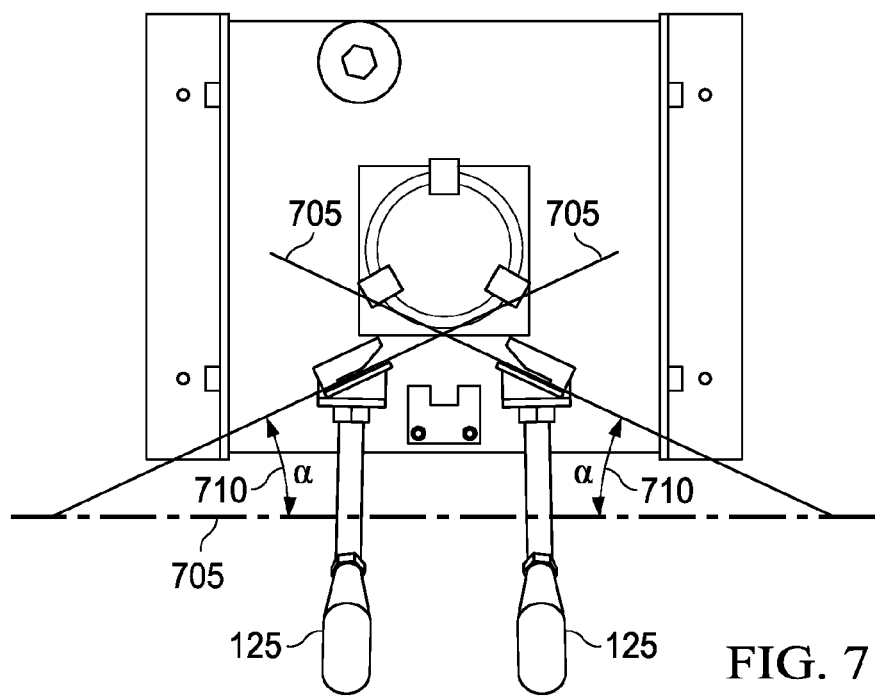
FIG. 7 shows a top view of an embodiment of the apparatus illustrated in FIG. 6 in which the wrap applicator arms are rotated to a position in which mating fastening components on either end of the wrap may be coupled together.

FIG. 7 shows a top view of an embodiment of the apparatus 100 illustrated in FIG. 6 in which the wrap applicator arms 125 are rotated to or beyond a position in which mating fastening components 210 on either end of the wrap 205 may be coupled together. While FIG. 7 illustrates the above-referenced position of the wrap applicator arms 125, FIG. 7 does not include an illustration of the wrap 205 so as not to obscure the illustration of the arrangement of the recess/holding slots. In one embodiment, the recess/holding slots are arranged such that the opening of each recess/holding slot faces an area in which the mating fastening components 210 on either end of the wrap 205 are coupled together as illustrated in FIG. 6. When the wrap applicator arms 125 are rotated back towards their starting position illustrated in FIG. 1, the coupling of the mating fastening components 210 creates a counterforce to enable the rigid members 805 to slide out of the recess/holding slots.

For example, three lines 705 are superimposed upon the embodiment illustrated in FIG. 7. These lines 705 define angles at which the wrap applicator arm recess/holding slots are arranged. In one embodiment, the angles 710 defined by the lines 705 are 20 degree angles. In an alternate embodiment, the angels 710 are within a range of 17-23 degrees.

Figure 8:
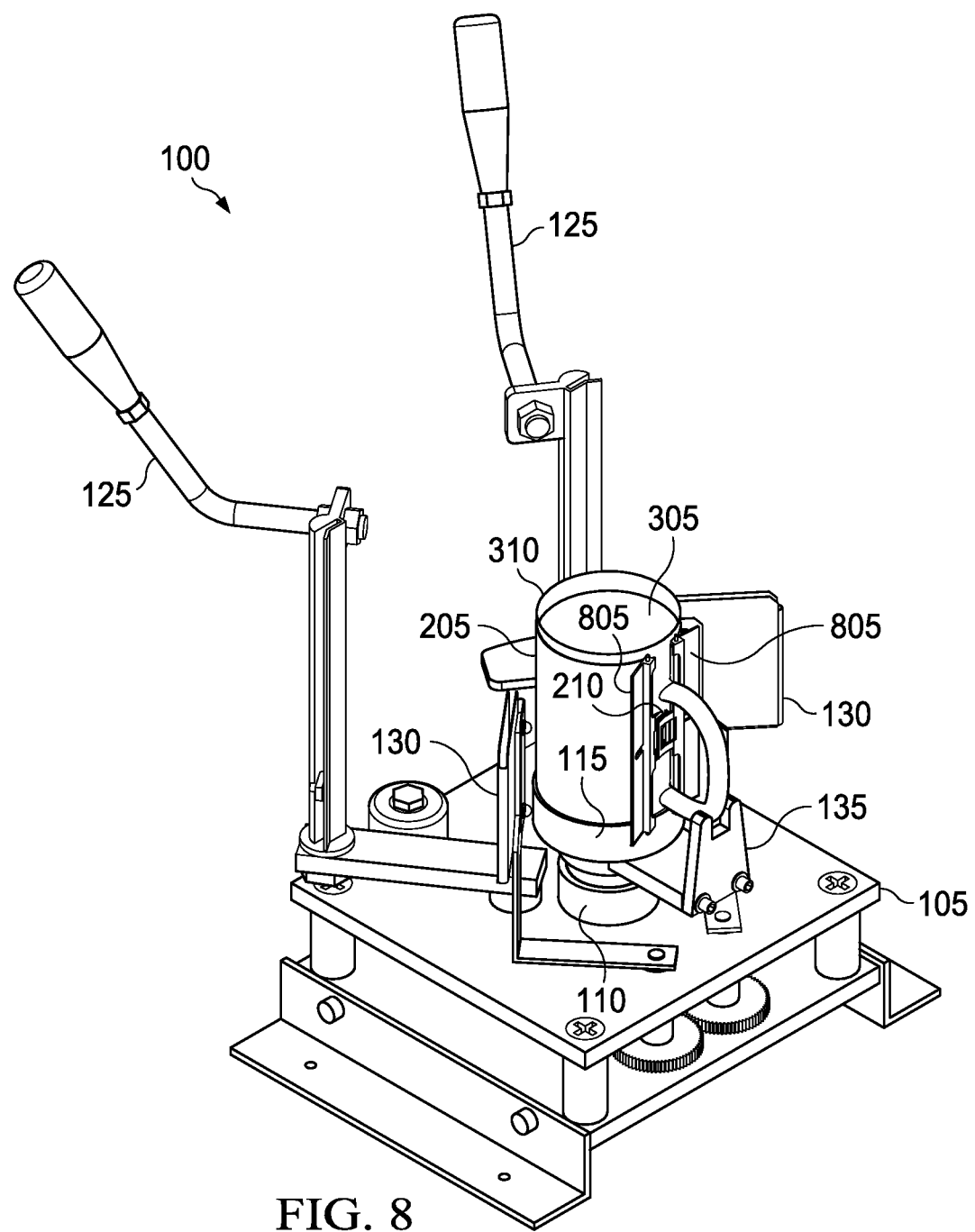
FIG. 8 shows a perspective view of the apparatus illustrated in FIG. 6 in which the ends of the wrap are released from the wrap applicator arms.

FIG. 8 shows a perspective view of the apparatus 100 illustrated in FIG. 6 in which the rigid members 805 of the wrap 205 are released from the wrap applicator arms 125. As discussed above the wrap applicator arm recess/holding slots are arranged (e.g., depth, width, angle, etc.) to release the rigid members 805 when the wrap mating fastening components 210 are coupled together. The coupling of the mating fastening components 210 creates a counterforce to the rotation of the wrap applicator arms 125 back towards the starting position that overcomes the tension and friction between the rigid members 805 and the holding slots.

In one embodiment, when the apparatus 100 includes image transfer paper positioning arms 130, the image transfer paper positioning arms 130 automatically rotate towards a starting position in response to the rotation of the wrap applicator arms 125 back towards their starting position. As described above, the rotation of the image transfer paper positioning arms 130 may be caused by the way of gears and/or one or more cams to translate the rotation of the wrap applicator arms 125 into rotation of the image transfer paper positioning arms 130. Alternatively, the image transfer paper positioning arms 130 may return to a starting position by way of a spring 415 or manual manipulation.

Figure 9:
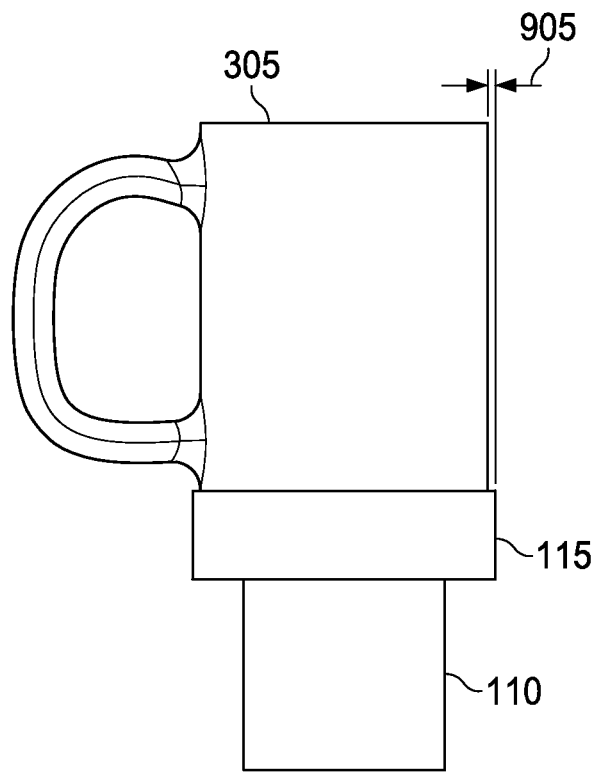
FIG. 9 shows a side view of a container placed upon the support member according to one embodiment.

FIG. 9 shows a side view of a container 305 placed upon the support member 110. As described above, a container 305 is placed upon the support 110 such that an opening in the container 305 receives a top potion 120 of the support 110. The edge around the opening of the container 305 rests upon the shoulder 115. The perimeter of the shoulder 115 extends 905 beyond the perimeter of the edge of the container 305. This extension 905 of the shoulder 115 enables the shoulder 115 to receive and align the image transfer paper 310 with the edge of the container.

Figure 10A:
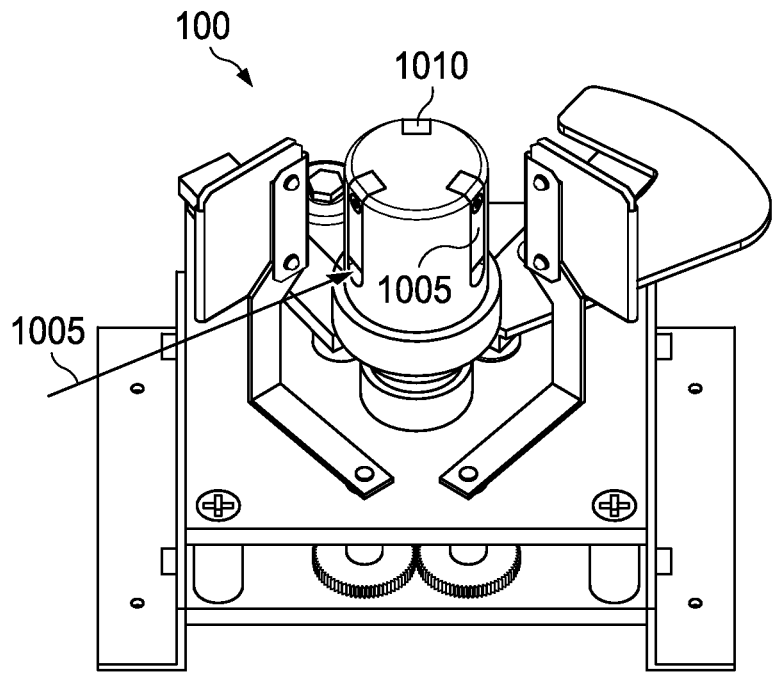
FIGS. 10A-B show two perspective views of an embodiment of the support member including movable members to accommodate containers with openings of varied sizes.
Figure 10B:
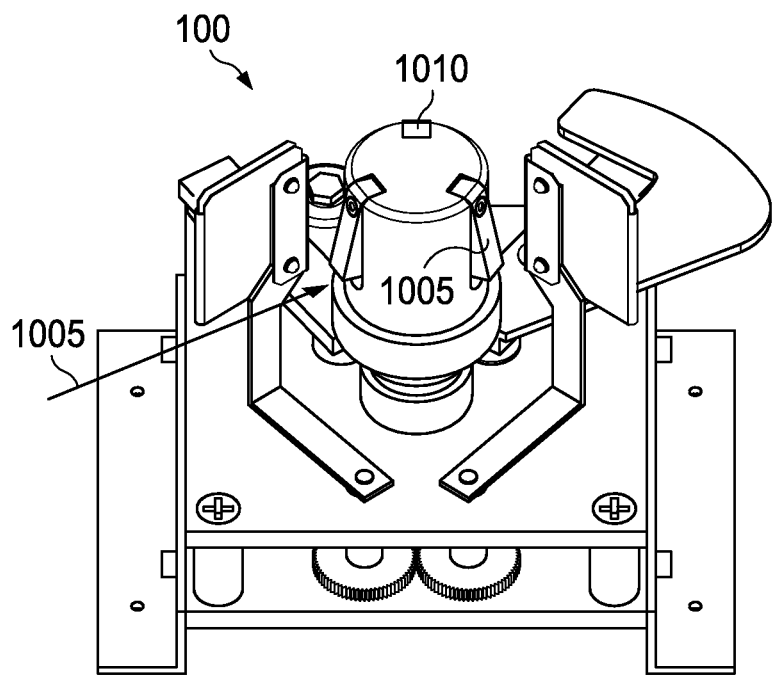

FIGS. 10A and 10B show two perspective views of an embodiment of the support member 110 including movable members 1005 to accommodate containers 305 with openings of varied sizes. The movable members 1005 include springs which allow the movable members 1005 to move between a compressed position as illustrated in FIG. 10A and an extended position as illustrated in FIG. 10B. Without an opposing force, the springs maintain the movable members in an extended position. For example, when a container 305 having a small diameter is placed upon the support member 110, the interior walls of the container 305 make contact with the movable members 1005 and press them into a compressed position. The larger the diameter of the opening/interior of the container 305, the more extended the movable members 1005 remain. The movable members 1005, in the positions between compressed and extended, therefore secure containers 305 with openings of various sizes by limiting movement the container 305 when the wrap 205 is applied to the container 305.

In one embodiment, the support member 110 also includes a spacer 1010. In one embodiment, the spacer 1010 has a similar appearance to the movable members 1005 but does not move between compressed and extended positions. Alternatively, the spacer 1010 is an integrally formed bump, curve, or other feature of the support 110. The spacer 1010 provides resistance against the inner surface of the container 305 and aids in providing the proper amount of extension 905 of the shoulder 115 beyond the perimeter of the edge of the container 305, ensuring there will be enough surface on the shoulder to register the transfer paper.

In one embodiment, the spacer 1010 is located at or near the first point of contact for wrap 205 when applied to a container 305. Pulling the wrap around the container 305 creates a force on this portion of the container 305. Utilizing a static spacer 2010 (e.g., as opposed to movable/spring-loaded members 1005) prevents the container 305 from moving in response to this force which could create uneven paper alignment.

Figure 11:
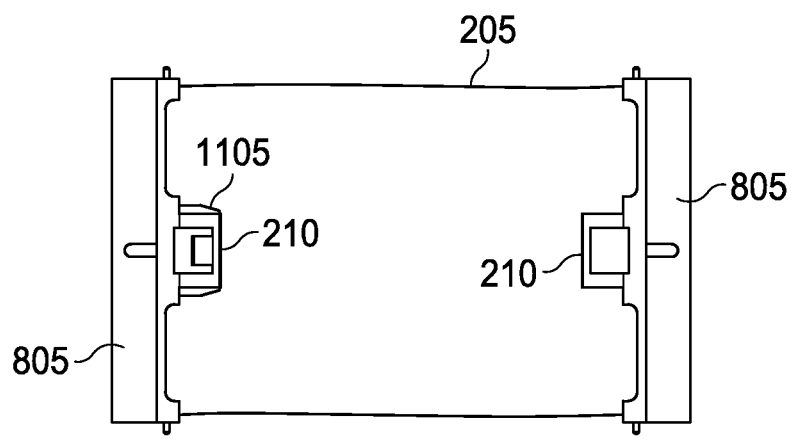
FIG. 11 shows a wrap according to one embodiment.

FIG. 11 shows a wrap 205 according to one embodiment. As described above, the wrap 205 includes mating fastening components 210, a protection member 1005, and rigid members 805 at either end of the wrap 205. The body of the wrap 205 is comprised of an elastic material. By wrapping the elastic body around a container 305, the wrap 205 acts as a compression device to apply consistent pressure over the surface of the image transfer paper 310 and container 305.

In one embodiment, the mating fastening components 210 are comprised of metal or another rigid material that can scratch the exterior surface of the container. In order to prevent scratching, one embodiment of the wrap 205 includes a protection member 1105 near one of the mating fastening components 210. When the mating fastening components 210 are coupled together, or decoupled from one another, the protection member 1105 shields the surface of the container from being scratched by the moving mating fastening components 210. In one embodiment, the protection member 1105 is made of a polymer, such as a plastic, or a similar material.

Figure 12:
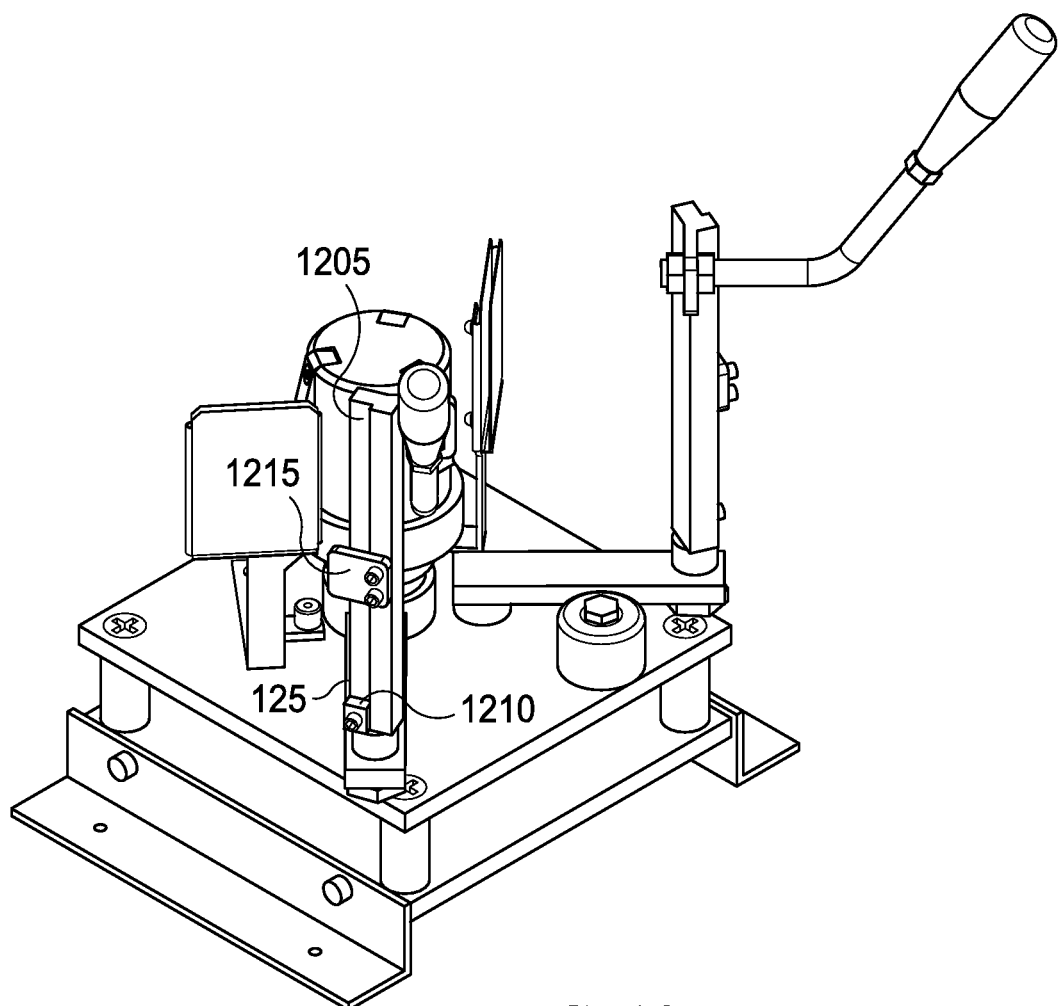
FIG. 12 shows a perspective view of a wrap applicator arm according to one embodiment.

FIG. 12 shows a perspective view of a wrap applicator arm 125 according to one embodiment. The wrap applicator arm 125 includes a vertical groove, notch, slot, or other recess 1205 to receive a rigid member 805. A plate 1215 provides an opposing wall for the recess 1205 to assist in receiving the rigid member 805 and to create tension and friction to hold the rigid member 805 in place. In one embodiment, the vertical height of the plate 1215 is less than the height of the vertical recess 1205 (as illustrated in FIG. 11). Alternatively, the vertical height of the plate 1215 is equal to or greater than the height of the vertical recess 1205 (as illustrated in FIGS. 1-6).

In one embodiment, the wrap applicator arms 125 include an adjustable stop 1210 to control the height at which a wrap 205 is held. For example, the adjustable stop 1210 may include a pin, bolt, screw, or equivalent component to secure the adjustable stop in various positions along a vertical recess 1205 in the wrap applicator arm 125. Additionally, the vertical recess 1205 may further include stepped, horizontal groves or slots for discrete adjustments in height. Moving the adjustable stop 1210 higher along the vertical recess 1205 increases a corresponding height at which a wrap 205 is held by the wrap applicator arms 125.

Figure 13:
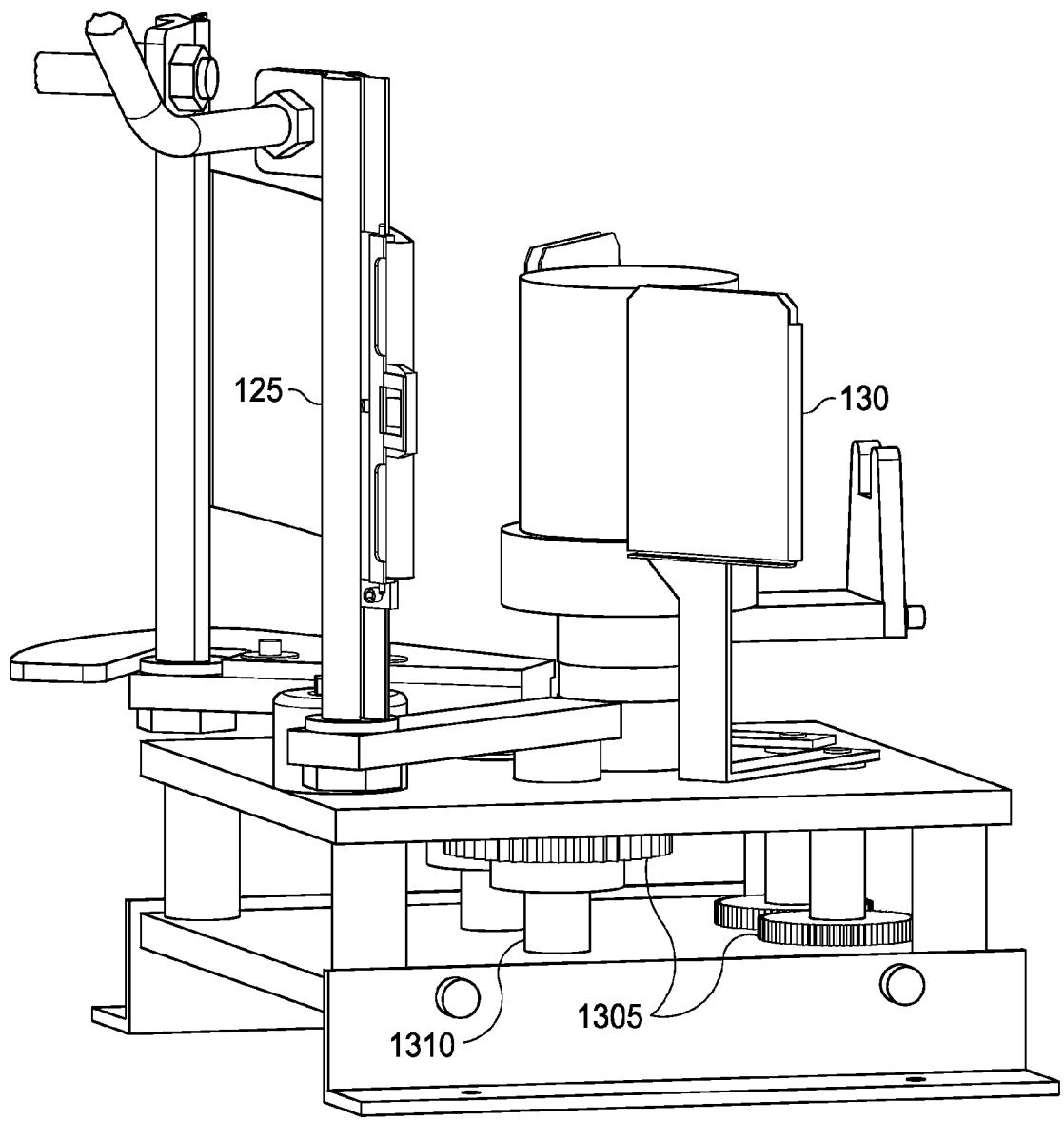
FIG. 13 shows a side view of the apparatus illustrated in FIG. 2 including a motor for automated rotation of the wrap applicator arms.

FIG. 13 shows a side view of the apparatus 100 illustrated in FIG. 2. In one embodiment, each wrap applicator arm 125 is coupled to a gear 1305. In one embodiment, the gears 1305 for the two wrap applicator arms 125 are coupled to one another such that rotation of one wrap applicator arm 125 translates through the interaction of the gears 1305 to cause the rotation of the other wrap applicator arm 125. In one embodiment, the gears 1305 for the two image transfer paper positioning arms 130 are coupled to one another such that rotation of one image transfer paper positioning arm 130 translates through the interaction of the gears 1305 to cause the rotation of the other image transfer paper positioning arm 130.

In one embodiment, one or both wrap applicator arms 125 is coupled to a cam and/or second set of gears 1305 that are, in turn, coupled to image transfer paper positioning arms 130. As described above, the coupling of the wrap applicator arms 125 with a cam 405 translates rotation of a wrap applicator arm 125 into rotation of one or both image transfer paper positioning arms 130.

In one embodiment, the apparatus includes a motor 1310 for automated rotation of one or more of the arms. In one embodiment, the motor is activated or otherwise controlled by a computer. Alternatively, the motor 1310 is activated or otherwise controlled manually by an operator. In an alternate embodiment, the arms are rotated manually by an operator rather than by a motor.

Figure 14:
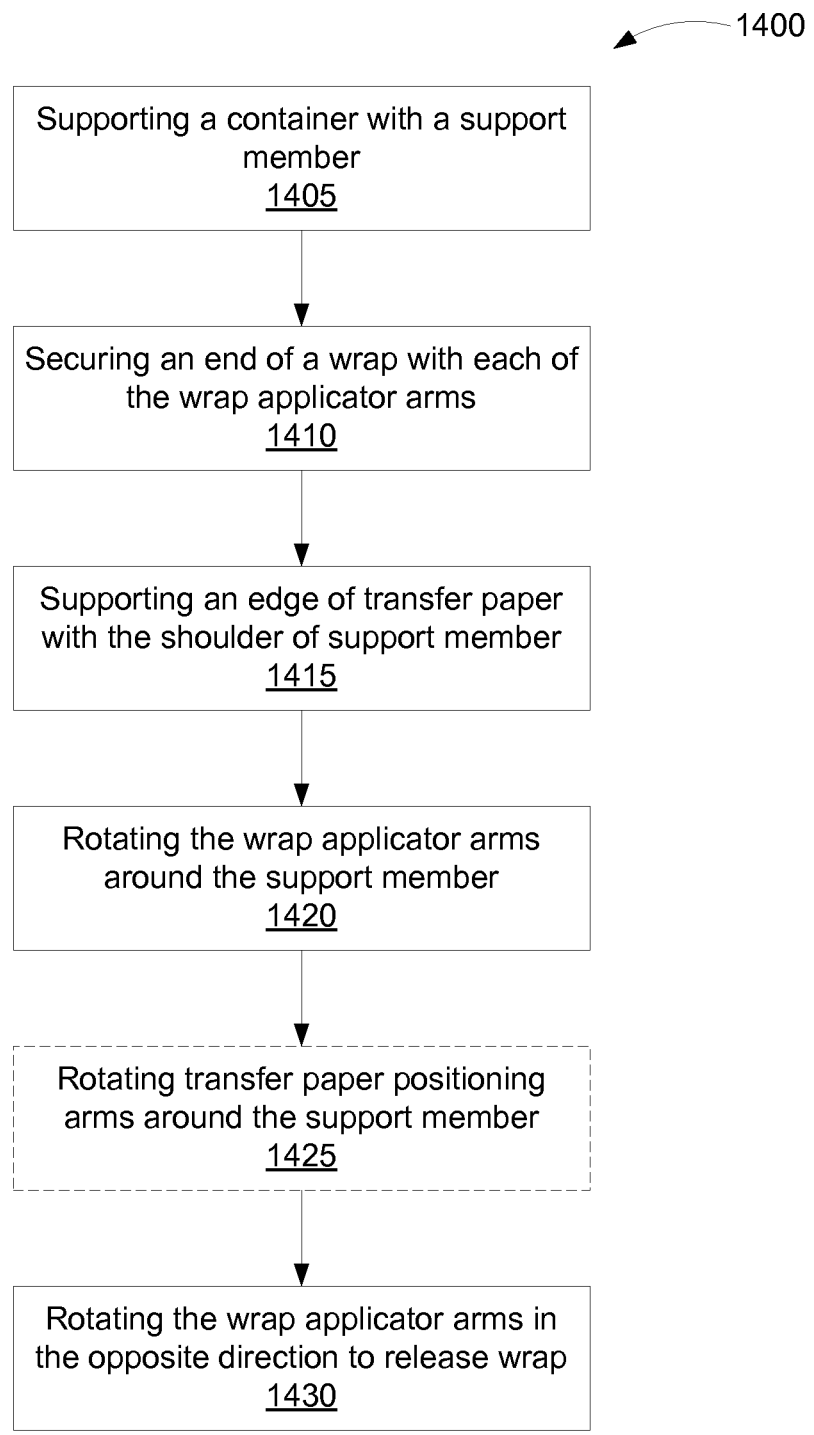
FIG. 14 is a flow chart illustrating method of affixing an image transfer paper to a curved surface of a container according to one embodiment.

FIG. 14 is a flow chart illustrating method 1400 of affixing an image transfer paper 310 to a curved surface of a container 305 according to one embodiment. At block 1405, a container 305 is supported by a support member 110. As described above, an end of the container 305 (e.g., the edge around an opening of the container 305) rests upon the shoulder 115.

At block 1410, an end of the wrap 205 is secured by each of the wrap applicator arms 125. As described above, in one embodiment, the wrap 205 includes rigid members 805 at either end. Each rigid member 805 is inserted into a recess 1205 in a corresponding wrap applicator arm 125. As described above, tension on either end of the wrap 205, e.g., caused by elasticity of the body of the wrap 205, creates lateral torque on the rigid members 805. This torque, combined with friction between the rigid member and the wrap applicator arm 125, holds the ends of the wrap 205 within the recesses 1205 in the wrap applicator arms 125.

At block 1415, an edge of the image transfer paper 310 is supported by the shoulder 115. As described above, the perimeter of the shoulder 115 extends 805 beyond the perimeter of the edge of the container 305, enabling the shoulder 115 to receive and align the image transfer paper 310 with the edge of the container. In one embodiment, the image transfer paper 310 is held in position manually or by a piece of tape. Alternatively, ends of the image transfer paper 310 are inserted into slots of image transfer paper positioning arms 130, which hold the image transfer paper 310 in the aligned position.

At block 1420, the wrap applicator arms 125 are rotated about the support member 110 to bring the wrap 205 in contact with the container 305 and, ultimately, wrap around the container 305 to hold the image transfer paper 310 in the aligned position. As described above, the wrap applicator arms 125 are rotated to a position to cause the mating fastening components 210 to couple together.

At block 1425, if the embodiment of the apparatus 100 includes image transfer paper positioning arms 130 (the option of this embodiment indicated by the broken line box), the image transfer paper positioning arms 130 are also rotated about the support member 110. As described above, the image transfer paper positioning arms 130 may be triggered to rotate in response to the rotation of the wrap applicator arms 125 using a combination of one or more coupled gears and/or cams.

At block 1430, the wrap applicator arms 125 are rotated in the opposite direction (back towards a starting position) to cause the recess 1205 to release the rigid members 805 due to a counterforce resulting from the wrap mating fastening components 210 being coupled together.

In one embodiment, a human operator performs or causes one or more of the operations described with references to the method 1300. Alternatively, or additionally, an automated device, such as a robotic arm, conveyer system, motor, or other known device performs or causes one or more of the operations described with references to the method 1400.

In the foregoing specification, the invention has been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. An apparatus to affix an image transfer paper to a curved surface of a container having an opening and edge around the opening, the apparatus comprising:
    a base;
    a support member coupled to the base to support an end of the container, wherein the support member includes a shoulder upon which the end of the container rests when the container is placed upon the support member and, the support member having an elevated portion received by the opening in the container, and wherein a perimeter of the shoulder extends beyond a perimeter of the edge of the container to receive and align the image transfer paper with the edge of the container;
    two wrap applicator arms rotatably coupled to the base in a pivoting manner, each wrap applicator arm configured to receive a respective end of a wrap such that, when the wrap applicator arms are rotated about the support member, the wrap applicator arms stretch the wrap around the container and image transfer paper; and two image transfer paper positioning arms rotatably coupled to the base in a pivoting manner, each image transfer paper positioning arm to receive a respective end of the image transfer paper.

2. The apparatus of claim 1, wherein an exterior perimeter of the portion of the support member that is received within the opening of the container further comprises movable members to accommodate containers with openings of varied sizes, wherein moving the members changes the size of the exterior.

3. The apparatus of claim 1, wherein the image transfer paper positioning arms are triggered to rotate in response to the wrap applicator arms being rotated about the support member.

4. The apparatus of claim 3, wherein the rotation of the image transfer paper positioning arms is triggered after the wrap applicator arms have rotated a predetermined amount.

5. The apparatus of claim 1, wherein the image transfer paper positioning arms include holding slots to receive respective ends of the image transfer paper and that release the image transfer paper as the image transfer paper positioning arms rotate about the support member.

6. An apparatus to affix an image transfer paper to a curved surface of a container having an opening and edge around the opening, the apparatus comprising:

a base;

a support member coupled to the base to support an end of the container, wherein the support member includes a shoulder upon which the end of the container rests when the container is placed upon the support member and, the support member having an elevated portion received by the opening in the container, and wherein a perimeter of the shoulder extends beyond a perimeter of the edge of the container to receive and align the image transfer paper with the edge of the container;

two wrap applicator arms rotatably coupled to the base in a pivoting manner, each wrap applicator arm configured to receive a respective end of a wrap such that, when the wrap applicator arms are rotated about the support member, the wrap applicator arms stretch the wrap around the container and image transfer paper, wherein each wrap applicator arm includes a holding slot to receive the respective end of the wrap.

7. The apparatus of claim 6, wherein the ends of the wrap include mating fastening components, and wherein the wrap applicator arm holding slots are arranged to maintain tension on the ends of the wrap while the applicator arms are rotated about the support member and arranged to release the ends of the wrap when the wrap mating fastening components are coupled together.

8. The apparatus of claim 6, wherein the wrap applicator arm holding slots include a plurality of locking stops to enable a plurality of vertical positions for the wrap.

9. An apparatus to affix an image transfer paper to a curved surface of a container having an opening and edge around the opening, the apparatus comprising:

a base:

a support member coupled to the base to support an end of the container, wherein the support member includes a shoulder upon which the end of the container rests when the container is placed upon the support member and, the support member having an elevated portion received by the opening in the container, and wherein a perimeter of the shoulder extends beyond a perimeter of the edge of the container to receive and align the image transfer paper with the edge of the container;

two wrap applicator arms rotatably coupled to the base in a pivoting manner, each wrap applicator arm configured to receive a respective end of a wrap such that, when the wrap applicator arms are rotated about the support member, the wrap applicator arms stretch the wrap around the container and image transfer paper, and wherein the container includes a handle and further comprising: a slotted support member to secure the handle of the container when the container is placed upon the support member.

10. The apparatus of claim 9, wherein the slotted support member is adjustable to accommodate handles of different sizes.

11. The apparatus of claim 1, further comprising:

a motor coupled to the base to cause the wrap applicator arms to rotate about the support member.

12. A method of affixing an image transfer paper to a curved surface of a container using a device including a base, support member coupled to the base, and two wrap applicator arms rotatably coupled to the base in a pivoting manner, the method comprising:

supporting an end of the container with the support member, wherein the support member includes a shoulder and, when the container is placed upon the support member such that an opening in the container receives a portion of the support member that is elevated above the shoulder, the end of the container rests upon the shoulder, and wherein a perimeter of the shoulder extends beyond a perimeter of the an edge of the container around the opening;

securing an end of a wrap to each of the wrap applicator arms;

supporting the image transfer paper with the support member such that an edge of the image transfer paper rests upon the shoulder to align the image transfer paper with the edge of the container, wherein the device further includes two image transfer paper positioning arms coupled to the base in a pivoting manner, and wherein supporting the image transfer paper comprises inserting ends of the image transfer paper into receiving portions of the paper positioning arms; and rotating the wrap applicator arms about the support member to stretch the wrap around the container and image transfer paper.

13. The method of claim 12, wherein an exterior perimeter of the portion of the support member that is received within the opening of the container further comprises movable members, and wherein placing the container upon the support member causes the movable members to change the size of the exterior perimeter of the portion of the support member that is received within the opening of the container to a size that corresponds to the size of the opening.

14. The method of claim 12, wherein rotating the wrap applicator arms being rotated about the support member includes causing the image transfer paper positioning arms to rotate.

15. The method of claim 12, further comprising:

rotating the image transfer paper positioning arms to a position in which the image transfer paper positioning arms to release the image transfer paper.

16. The method of claim 12, wherein ends of the wrap include mating fastening components, further comprising:

rotating the wrap applicator arms to a position that causes the mating fastening components to couple to one another, wherein the wrap applicator arm holding slots are arranged to maintain tension on the ends of the wrap while the applicator arms are rotated about the support member and arranged to release the ends of the wrap when the wrap mating fastening components are coupled together.

17. A method of affixing an image transfer paper to a curved surface of a container using a device including a base, support member coupled to the base, and two wrap applicator arms rotatably coupled to the base in a pivoting manner, the method comprising:
  supporting an end of the container with the support member, wherein the support member includes a shoulder and, when the container is placed upon the support member such that an opening in the container receives a portion of the support member that is elevated above the shoulder, the end of the container rests upon the shoulder, and wherein a perimeter of the shoulder extends beyond a perimeter of the an edge of the container around the opening, wherein the container includes a handle and wherein supporting the container with the support member includes placing the container in an orientation such that a handle is secured by a slotted support member;
  securing an end of a wrap to each of the wrap applicator arms;
  supporting the image transfer paper with the support member such that an edge of the image transfer paper rests upon the shoulder to align the image transfer paper with the edge of the container, wherein the device further includes two image transfer paper positioning arms coupled to the base in a pivoting manner, and wherein supporting the image transfer paper comprises inserting ends of the image transfer paper into receiving portions of the paper positioning arms; and
  rotating the wrap applicator arms about the support member to stretch the wrap around the container and image transfer paper.

18. The method of claim 12, wherein the rotating the wrap applicator arms includes activating a motor coupled to the base to cause the wrap applicator arms to rotate about the support member.

* * * * *